US011648903B2

(12) United States Patent
Ko et al.

(10) Patent No.: US 11,648,903 B2
(45) Date of Patent: May 16, 2023

(54) STEERING WHEEL MODULE FOR VEHICLE

(71) Applicant: HYUNDAI MOBIS CO., LTD., Seoul (KR)

(72) Inventors: Seok Hoon Ko, Yongin-si (KR); Min June Song, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 80 days.

(21) Appl. No.: 17/242,235

(22) Filed: Apr. 27, 2021

(65) Prior Publication Data
US 2021/0362667 A1    Nov. 25, 2021

(30) Foreign Application Priority Data
May 22, 2020   (KR) .................. 10-2020-0061891

(51) Int. Cl.
*B60R 21/203*   (2006.01)
*B62D 1/04*     (2006.01)
*B60K 35/00*    (2006.01)

(52) U.S. Cl.
CPC .......... *B60R 21/2035* (2013.01); *B62D 1/04* (2013.01); *B60K 35/00* (2013.01); *B60K 2370/691* (2019.05); *B60K 2370/782* (2019.05)

(58) Field of Classification Search
CPC ........... B60R 21/2035; B60R 2011/001; B60R 11/0235; B60R 21/203; B60R 2011/0052; B60R 2011/0066; B62D 1/04; B62D 1/046; B60K 35/00; B60K 2370/691; B60K 2370/782; B60Y 2304/07
See application file for complete search history.

(56) References Cited

U.S. PATENT DOCUMENTS 10,144,383 B2 * 12/2018 Bodtker ................ B60R 21/203
2022/0242355 A1 *  8/2022 Song .................... B60R 21/203

FOREIGN PATENT DOCUMENTS

| DE | 102004042331 A1 | * | 12/2005 | ............ B60K 35/00 |
| DE | 102019106334 A1 | * | 9/2020 | ............ B62D 1/183 |
| DE | 102019112875 A1 | * | 11/2020 | ............ B60K 35/00 |
| KR | 10-1607138 | | 3/2016 | |
| KR | 20220030691 A | * | 3/2022 | ............ B60R 21/203 |
| KR | 20220046335 A | * | 4/2022 | ............ B60R 21/203 |
| KR | 20220101437 A | * | 7/2022 | ............ B60R 21/203 |
| KR | 20220112057 A | * | 8/2022 | ............ B60R 21/203 |

* cited by examiner

*Primary Examiner* — Drew J Brown
(74) *Attorney, Agent, or Firm* — DLA Piper LLP (US)

(57) ABSTRACT

A steering wheel module for a vehicle, the steering wheel module including: a steering wheel having a rim formed in a ring shape, and a body part extending from a central portion of the rim toward a vehicle and coupled to the vehicle; an airbag device coupled to the body part and having a cushion configured to be deployed toward a driver when the airbag device operates; and a display device coupled to the body part in a state in which the display device is spaced apart from the airbag device and positioned to be closer to the driver than the airbag device.

12 Claims, 4 Drawing Sheets

STEERING WHEEL MODULE FOR VEHICLE

CROSS-REFERENCE TO RELATED APPLICATION

This application claims priority from Korean Patent Application No. 10-2020-0061891, filed on May 22, 2020, in the Korean Intellectual Property Office, the disclosure of which is incorporated herein by reference in its entirety.

TECHNICAL FIELD

The present disclosure relates to a steering wheel module having an airbag device and a display device coupled to a steering wheel for a vehicle.

BACKGROUND

A steering wheel of a vehicle is held and rotated by a driver to change directions of wheels of the vehicle, thereby adjusting a traveling direction of the vehicle. The steering wheel is disposed at a position at which the driver in the vehicle can most easily use the steering wheel.

Further, in order to allow the driver to safely drive the vehicle, an instrument panel is installed on a dashboard in front of a driver seat in the vehicle and accurately provides the driver with information on a driving state and information on operations of various devices. The instrument panel has analogue gauges and indicator lamps. Recently, there is used a number or bar graph indicator lamp employing a new type of component such as a light emitting diode, a fluorescent display panel, and an electric meter using an electronic circuit.

In particular, the steering wheel is positioned between the driver and the instrument panel installed on the dashboard in the vehicle. The steering wheel is provided with not only a horn switch and an airbag, but also a remote controller for controlling an audio system or the like. However, because the steering wheel is disposed between the instrument panel and the driver, a visual field of the driver directed toward the instrument panel may be partially interrupted by the steering wheel, and it is difficult to ensure the visual field directed toward the instrument panel.

Therefore, there has been developed a steering wheel for a vehicle, on which a display for providing information on the vehicle is mounted.

However, because the airbag for protecting the driver is mounted on the steering wheel of the vehicle and the airbag and the display are mounted together, there is a problem in that the display is damaged when the airbag is deployed.

The above-mentioned matters described as the background art are provided merely to aid understanding of the background of the present disclosure, and should not be construed to admit that the matters correspond to the technologies already known to those skilled in the art.

SUMMARY

The present disclosure has been made in an effort to solve the above-mentioned problems, and an object of the present disclosure is to provide a steering wheel module having an airbag device and a display device which are mounted on a body part of a steering wheel so as to be spaced apart from each other, thereby preventing a display device from being damaged by impact when the airbag device is deployed.

In one aspect, the present disclosure provides a steering wheel module for a vehicle, the steering wheel module including: a steering wheel having a rim formed in a ring shape, and a body part extending from a central portion of the rim toward a vehicle and coupled to the vehicle; an airbag device coupled to the body part and having a cushion configured to be deployed toward a driver when the airbag device operates; and a display device coupled to the body part in a state in which the display device is spaced apart from the airbag device and positioned to be closer to the driver than the airbag device.

The steering wheel module may further include: a first bracket having one end coupled to the body part and the other end extending toward the driver and coupled to the airbag device; and a second bracket having one end coupled to the body part and the other end coupled to the display device and extending toward the driver further than the other end of the first bracket.

The first bracket and the second bracket may extend in a state in which the first bracket and the second bracket overlap each other in a partial area, and the body part may have a coupling groove so that the first bracket and the second bracket, which overlap each other, penetrate the coupling groove or are inserted into the coupling groove.

A plurality of coupling grooves may be formed to be spaced apart from one another in a direction from a center of the rim to a plane on which the rim extends.

A fastening part may be provided on the body part and may extend from one side edge of the coupling groove toward the driver or the vehicle, and the first bracket and the second bracket penetrating the coupling groove may be simultaneously coupled to the fastening part in the state in which the first bracket and the second bracket overlap each other.

The fastening part may have a first recessed groove recessed toward a center of the rim, and the first bracket and the second bracket may be fastened to the fastening part by being inserted into the first recessed groove in the state in which the first bracket and the second bracket overlap each other.

The first bracket may have a second recessed groove recessed to correspond to the second bracket, and the second bracket may be inserted into the second recessed groove and may extend in a state in which the first bracket and the second bracket overlap each other in a partial area.

The second bracket may have a second recessed groove recessed to correspond to the first bracket, and the first bracket may be inserted into the second recessed groove and may extend in a state in which the first bracket and the second bracket overlap each other in a partial area.

The first bracket and the second bracket may extend to be slidable relative to each other in a partial area in a state in which the first bracket and the second bracket overlap each other, and the first bracket and the second bracket may have a protrusion and an insertion groove, respectively, to prevent a sliding movement at a preset sliding position.

The protrusion may include: a first catching projection formed to be stepped from a surface of the first bracket or the second bracket toward the driver; and a first inclined portion inclined in a direction from the catching projection to the vehicle.

The protrusion may include: a first catching projection formed to be stepped from a surface of the first bracket or the second bracket toward the vehicle; and a second inclined portion inclined in a direction from the catching projection to the vehicle.

A first through hole may be formed at one end of the first bracket and may penetrate the first bracket toward a center of the rim, a second through hole may be formed at one end of the second bracket and may penetrate the second bracket toward the center of the rim, and the first bracket and the second bracket may be coupled to the body part by a bolt simultaneously penetrating the first through hole and the second through hole in the state in which the first bracket and the second bracket overlap each other.

The steering wheel module for a vehicle according to the present disclosure includes the rim and the body part, the airbag device and the display device are mounted on the body part so as to be spaced apart from each other by the first bracket and the second bracket, and as a result, it is possible to protect the display device by preventing the display device from being damaged by a deployment pressure when the airbag cushion of the airbag device is deployed.

In addition, the first bracket and the second bracket overlap each other and are coupled to the body part in the state in which the first bracket and the second bracket are preliminarily coupled by sliding before being coupled to the body part, and as a result, it is possible to improve assembly properties.

In addition, in the state in which the first bracket and the second bracket are coupled to each other by sliding, the first bracket and the second bracket are inserted into the coupling groove of the body part and fixed to the fastening part, such that the first bracket and the second bracket may be securely fixed to the body part even though the steering wheel rotates.

DETAILED DESCRIPTION OF THE PREFERRED EMBODIMENTS

Figure 1:
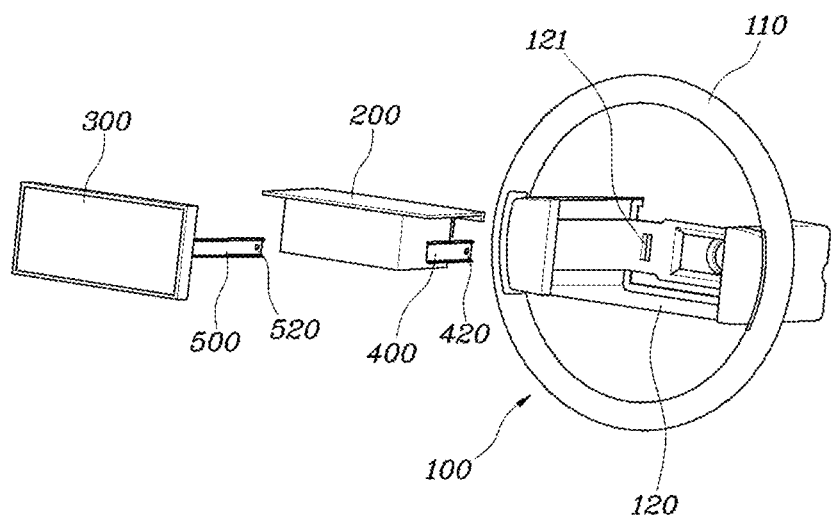
FIG. 1 is an exploded perspective view illustrating a steering wheel module for a vehicle according to an embodiment of the present disclosure.

Specific structural or functional descriptions of embodiments of the present disclosure disclosed in this specification or application are exemplified only for the purpose of explaining the embodiments according to the present disclosure, the embodiments according to the present disclosure may be carried out in various forms, and it should not be interpreted that the present disclosure is limited to the embodiments described in this specification or application.

Because the embodiments according to the present disclosure may be variously changed and may have various forms, specific embodiments will be illustrated in the drawings and described in detail in the present specification or application. However, the descriptions of the specific embodiments are not intended to limit embodiments according to the concept of the present disclosure to the specific embodiments, but it should be understood that the present disclosure covers all modifications, equivalents and alternatives falling within the spirit and technical scope of the present disclosure.

The terms such as "first," "second," and other numerical terms may be used herein only to describe various elements, but these elements should not be limited by these terms. These terms are used only for the purpose of distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used to just describe a specific embodiment and do not intend to limit the present disclosure. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present disclosure pertains. The terms such as those defined in a commonly used dictionary should be interpreted as having meanings consistent with meanings in the context of related technologies and should not be interpreted as ideal or excessively formal meanings unless explicitly defined in the present specification.

Hereinafter, an exemplary embodiment of the present disclosure will be described in detail with reference to the accompanying drawings. Like reference numerals indicated in the respective drawings refer to like members.

Figure 2:
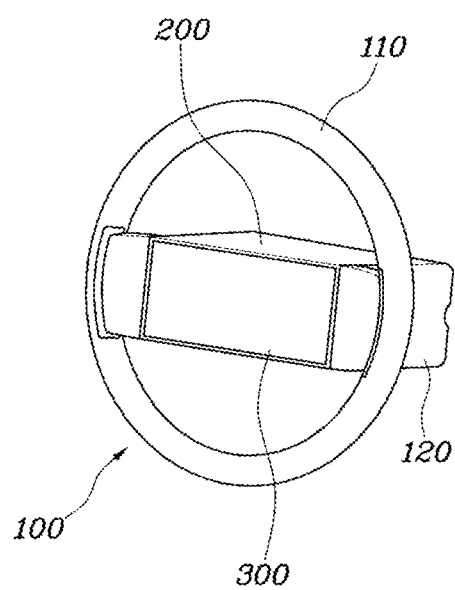
FIG. 2 is a perspective view illustrating a steering wheel module for a vehicle according to the embodiment of the present disclosure.
Figure 3:
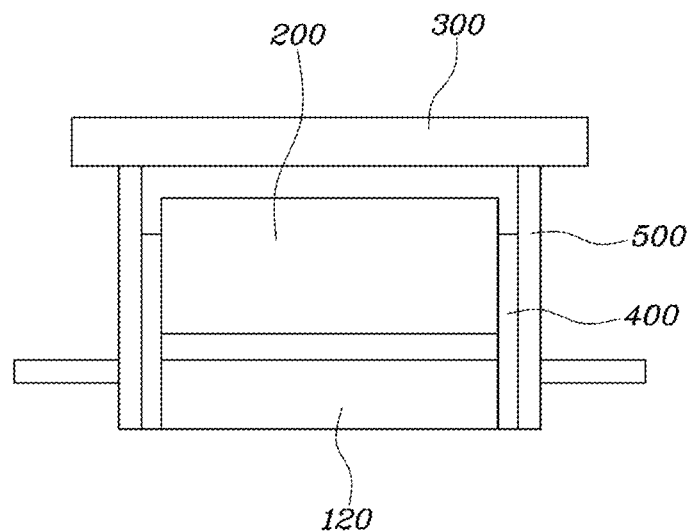
FIG. 3 is a transverse sectional view of FIG. 2.
Figure 4:
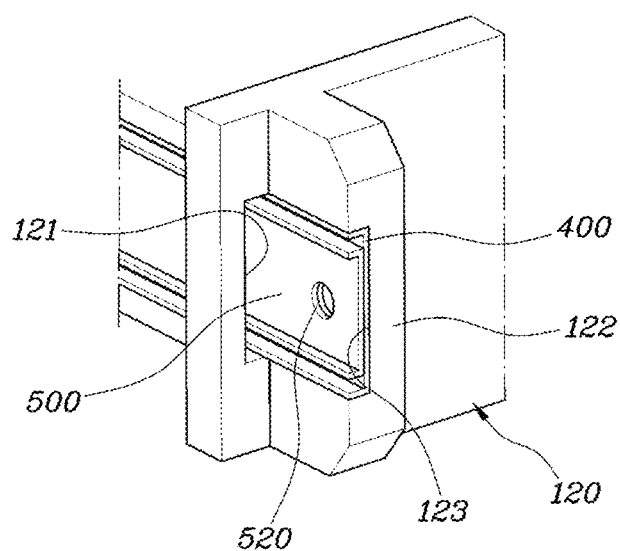
FIG. 4 is an enlarged view illustrating a portion where a first bracket, a second bracket, and a body part of the steering wheel module for a vehicle according to the embodiment of the present disclosure are coupled to one another.

FIG. 1 is an exploded perspective view illustrating a steering wheel 100 module for a vehicle according to an embodiment of the present disclosure, FIG. 2 is a perspective view illustrating the steering wheel 100 module for a vehicle according to the embodiment of the present disclosure, FIG. 3 is a transverse sectional view of FIG. 2, and FIG. 4 is an enlarged view illustrating a portion where a first bracket 400, a second bracket 500, and a body part 120 according to the steering wheel 100 module for a vehicle according to the embodiment of the present disclosure are coupled to one another.

Hereinafter, the steering wheel 100 module for a vehicle according to the exemplary embodiment of the present disclosure will be described with reference to FIGS. 1 to 8.

The steering wheel 100 module for a vehicle according to the present disclosure has been developed such that an airbag for protecting a driver and a display device 300 for displaying information on the vehicle are mounted on a steering wheel 100 of the vehicle.

Specifically, the steering wheel 100 module for a vehicle according to the present disclosure includes: the steering wheel 100 having a rim 110 formed in a ring shape, and the body part 120 extending from a central portion of the rim 110 toward the vehicle and coupled to the vehicle; an airbag device coupled to the body part 120 and having a cushion configured to be deployed toward the driver when the airbag device operates; and a display device 300 coupled to the body part 120 in a state in which the display device 300 is spaced apart from the airbag device and positioned to be closer to the driver than the airbag device.

Referring further to FIGS. 1 to 2, the steering wheel 100 may include the ring-shaped rim 110 provided to allow the driver to operate a steering system of the vehicle, and a body part 120 provided to couple the rim 110 to the vehicle. The body part 120 is connected to the steering system of the vehicle and configured such that the driver may control the steering system of the vehicle by rotating the rim 110.

An airbag module 200 includes an airbag cushion and an inflator. In the event of a collision accident of the vehicle, an airbag gas is injected into the airbag cushion from the inflator, such that the airbag cushion may be deployed toward an area in front of the driver, thereby protecting the driver.

The display device 300 may display information on traveling of the vehicle and information on the vehicle such as navigation information. The display device 300 according to the present disclosure is mounted on the steering wheel 100 in order to solve a problem in the related art in that a cluster of the vehicle is interrupted by the rim 110 of the steering wheel 100.

In addition, since the airbag module 200 and the display device 300 are mounted on the steering wheel 100 so as to be spaced apart from each other, it is possible to prevent the display device 300 from being damaged by a pressure generated from the inflator when the airbag cushion of the airbag module 200 is deployed.

The steering wheel module may further include: the first bracket 400 having one end coupled to the body part 120 and the other end extending toward the driver and coupled to the airbag device; and the second bracket 500 having one end coupled to the body part 120 and the other end coupled to the display device 300 and extending toward the driver further than the other end of the first bracket 400.

Referring further to FIGS. 1 to 3, the first bracket 400 extends in a longitudinal direction thereof and has one end coupled to the body part 120. The plurality of first brackets 400 may be provided such that the other end of one first bracket and the other end of another first bracket may be coupled to left and right ends of the airbag device so as to be spaced apart from each other. The second bracket 500 extends toward the driver further than the first bracket 400 and has one end coupled to the body part 120. The plurality of second brackets may be provided such that the other end of one second bracket and the other end of another second bracket may be coupled to left and right ends of the display device 300 so as to be spaced apart from each other.

The airbag device and the display device 300 may be spaced apart from each other by a difference in length between the first bracket 400 and the second bracket 500 and integrally coupled to the steering wheel 100. Therefore, it is possible to prevent damage to the display device 300 even though the airbag cushion of the airbag device is deployed in the event of an accident of the vehicle.

The first bracket 400 and the second bracket 500 may extend in a state in which the first bracket 400 and the second bracket 500 overlap each other in a partial area. The body part 120 has a coupling groove 121 so that the first bracket 400 and the second bracket 500, which overlap each other, penetrate the coupling groove 121 or are inserted into the coupling groove 121.

Referring to FIG. 4, the first bracket 400 and the second bracket 500 may overlap each other and may be coupled to the body part 120. The coupling groove 121 may be formed to penetrate the body part 120 so that the first bracket 400 and the second bracket 500, which overlap each other, are inserted into the coupling groove 121.

The coupling groove 121 has a size corresponding to cross sections of the first bracket 400 and the second bracket 500, such that the first bracket 400 and the second bracket 500 may be fixed without swaying when the first bracket 400 and the second bracket 500 are inserted into the coupling groove 121.

Therefore, the first bracket 400 and the second bracket 500 may be modularized by being coupled to the body part 120 in a state in which the first bracket 400 and the second bracket 500 are integrally formed. The first bracket 400 and the second bracket 500 may be easily coupled only by inserting the first bracket 400 and the second bracket 500 into the coupling groove 121.

A plurality of coupling grooves 121 may be formed to be spaced apart from one another in a direction from a center of the rim 110 to a plane on which the rim 110 extends.

Referring further to FIG. 3, the two coupling grooves 121 may be formed at both sides of the body part 120 so as to be spaced apart from each other. In the state in which the first bracket 400 and the second bracket 500 overlap each other, one end of the first bracket 400 and one end of the second bracket 500 may be coupled and inserted into the coupling grooves 121 formed at both sides of the body part 120.

Therefore, the airbag device and the display device 300 may be securely fixed to the steering wheel 100 even though the driver rotates the steering wheel 100.

A fastening part 122 is provided on the body part 120 and extends from one side edge of the coupling groove 121 toward the driver or the vehicle. The first bracket 400 and the second bracket 500 penetrating the coupling groove 121 may be simultaneously coupled to the fastening part 122 in the state in which the first bracket 400 and the second bracket 500 overlap each other.

Referring further to FIG. 4, in the embodiment of the present disclosure, the fastening part 122 may extend from a rear side of the coupling groove 121 toward the vehicle, and one end of the first bracket 400 and one end of the second bracket 500 may be coupled to the fastening part 122.

In addition, the plurality of fastening parts may be provided and extend toward the rear sides of the two coupling grooves 121 formed in the body part 120 so as to be spaced apart from each other.

Therefore, it is possible to increase a coupling force between the first bracket 400, the second bracket 500, and the body part 120 and to easily assemble the first bracket 400, the second bracket 500, and the body part 120.

The fastening part 122 has a first recessed groove 123 recessed toward the center of the rim 110. In the state in which the first bracket 400 and the second bracket 500 overlap each other, the first bracket 400 and the second bracket 500 may be fastened to the fastening part 122 by being inserted into the first recessed groove 123.

Referring further to FIG. 4, the fastening part 122 has the first recessed groove 123 recessed toward the center of the rim 110, and the first bracket 400 and the second bracket 500, which are to be fastened to the fastening part 122, may be inserted into the first recessed groove 123 and fixed in an upward/downward direction.

The first recessed groove 123 supports upper portions, lower portions, and lateral portions of the first bracket 400 and the second bracket 500, which overlap each other, such that the airbag device and the display device 300 may be securely fixed without being distorted even when the driver rotates the steering wheel 100 in any direction.

The first bracket 400 has a second recessed groove 430 recessed to correspond to the second bracket 500, and the second bracket 500 is inserted into the second recessed groove 430 and extends in the state in which the first bracket 400 and the second bracket 500 overlap each other in a partial area.

Figure 5:
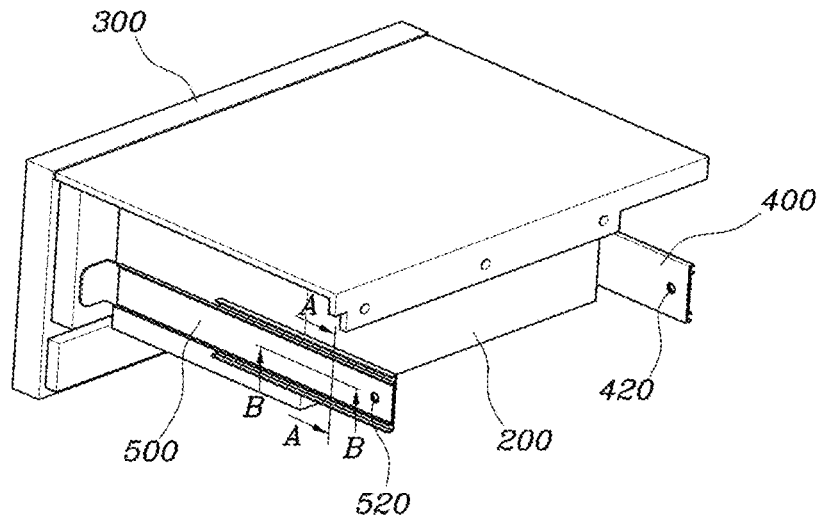
FIG. 5 is a view illustrating a state in which the first bracket and the second bracket overlap each other so that an airbag module and a display device of the steering wheel module for a vehicle according to the embodiment of the present disclosure are coupled to each other.
Figure 6:
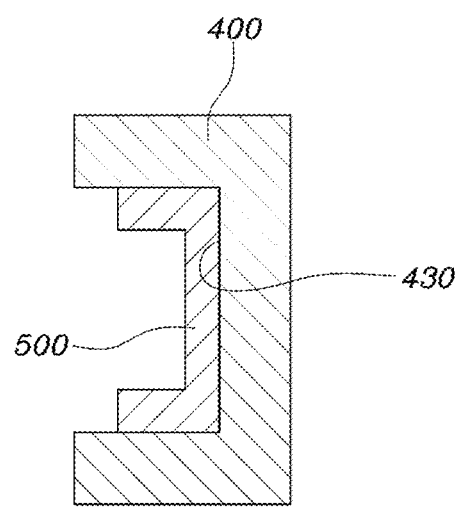
FIG. 6 is a cross-sectional view taken along line A-A in FIG. 5.

Referring further to FIGS. 5 to 6, the second recessed groove 430 having a size corresponding to the second bracket 500 is formed in the first bracket 400 in order to preliminarily couple the airbag device and the display device 300 before coupling the airbag device and the display device 300 to the steering wheel 100. The second bracket 500 may be inserted into the second recessed groove 430 by sliding, thereby preliminarily coupling the airbag device and the display device 300.

Therefore, since the airbag device and the display device 300 are preliminarily coupled before being coupled to the body part 120, the airbag device and the display device 300 may be stably coupled to the body part 120, thereby improving assembly properties.

In the embodiment of the present disclosure, the second recessed groove 430 is illustrated as being formed in an outer portion of the first bracket 400. However, by applying this configuration, the second recessed groove 430 may be formed in an inner portion of the first bracket 400, such that the second bracket 500 may be preliminarily coupled by sliding.

The second bracket 500 has the second recessed groove 430 recessed to correspond to the first bracket 400. The first bracket 400 is inserted into the second recessed groove 430 and extends in the state in which the first bracket 400 and the second bracket 500 overlap each other in a partial area.

In a second embodiment of the second recessed groove 430, the second recessed groove 430 may be formed in an inner portion or an outer portion of the second bracket 500, such that the first bracket 400 may be inserted into the second recessed groove 430 formed in the second bracket 500 by sliding, thereby preliminarily coupling the airbag device and the display device 300.

Therefore, in the state in which the first bracket 400 and the second bracket 500 overlap each other, the first bracket 400 and the second bracket 500 may be preliminarily coupled by various methods, thereby improving assembly properties.

FIG. 5 is a view illustrating the state in which the first bracket 400 and the second bracket 500 overlap each other so that the airbag module 200 and the display device 300 of the steering wheel 100 module for a vehicle according to the embodiment of the present disclosure are coupled, and FIG. 6 is a cross-sectional view taken along line A-A in FIG. 5.

The first bracket 400 and the second bracket 500 extend to be slidable relative to each other in a partial area in the state in which the first bracket 400 and the second bracket 500 overlap each other. The first bracket 400 and the second bracket 500 have a protrusion 410 and an insertion groove 510, respectively, in order to prevent the sliding movement of the first bracket 400 or the second bracket 500 at a preset sliding position.

Referring further to FIGS. 5 to 8, the protrusion 410 and the insertion groove 510 are formed on a surface of the first bracket 400 and a surface of the second bracket 500, which are in contact with each other, such that the protrusion 410 is inserted into the insertion groove 510 in an area in which one end of the first bracket 400 and one end of the second bracket 500 coincide with each other, thereby preventing the sliding movement of the first bracket 400 or the second bracket 500.

Figure 7:
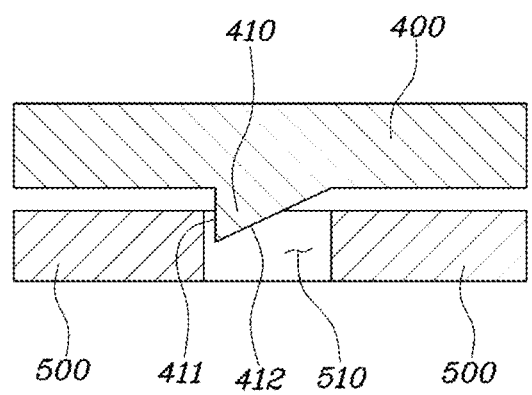
FIG. 7 is a cross-sectional view taken along line B-B in FIG. 5 and illustrates a first embodiment of a protrusion included in the steering wheel module for a vehicle according to the embodiment of the present disclosure.
Figure 8:
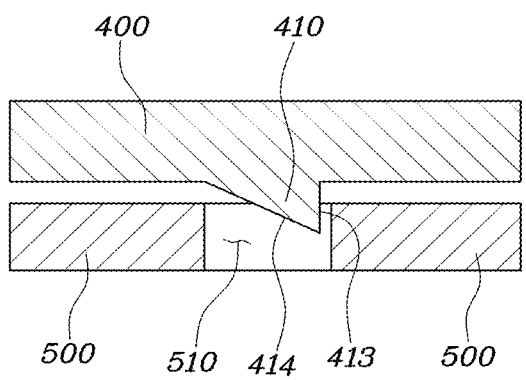
FIG. 8 is a cross-sectional view taken along line B-B in FIG. 5 and illustrates a second embodiment of the protrusion included in the steering wheel module for a vehicle according to the embodiment of the present disclosure.

FIGS. 7 to 8 illustrate that the protrusion 410 is formed on the first bracket 400, and the insertion groove 510 is formed in the second bracket 500. However, the positions at which the protrusion 410 and the insertion groove 510 are formed may be changed, the protrusion 410 may be formed on the second bracket 500, and the insertion groove 510 may be formed in the first bracket 400.

Therefore, the first bracket 400 and the second bracket 500 may be preliminarily coupled in the state in which one end of the first bracket 400 and one end of the second bracket 500 coincide with each other, and thereafter, the first bracket 400 and the second bracket 500 may be coupled to the body part 120.

Therefore, the structures of the protrusion 410 and the insertion groove 510 may prevent erroneous assembly.

FIG. 7 is a cross-sectional view taken along line B-B in FIG. 5 and illustrates a first embodiment of the protrusion 410 included in the steering wheel 100 module for a vehicle according to the embodiment of the present disclosure.

The protrusion 410 includes: a first catching projection 411 formed to be stepped from the surface of the first bracket 400 or the second bracket 500 toward the driver; and a first inclined portion 412 inclined in a direction from the first catching projection 411 to the vehicle.

Referring further to FIG. 7, in the first embodiment of the protrusion 410, when the first bracket 400 and the second bracket 500 are coupled by sliding and reach a coupling position, the protrusion 410 is inserted into the insertion groove 510.

In this case, since the first catching projection 411 is formed to be directed toward the driver, the first catching projection 411 is fixed to the insertion groove 510, such that the first bracket 400 may be prevented from moving toward the driver any further.

Therefore, a separation space may be formed between the airbag module 200 and the display device 300, and the first catching projection 411 may restrict the sliding movement of the first bracket 400, such that it is possible to prevent erroneous assembly even though an excessive force is applied during an assembly process.

FIG. 8 is a cross-sectional view taken along line B-B in FIG. 5 and illustrates a second embodiment of the protrusion 410 included in the steering wheel 100 module for a vehicle according to the embodiment of the present disclosure.

The protrusion 410 includes: a second catching projection 413 formed to be stepped from the surface of the first bracket 400 or the second bracket 500 toward the vehicle; and a second inclined portion 414 inclined in a direction from the second catching projection 413 to the vehicle.

Referring further to FIG. 8, in the second embodiment of the protrusion 410, when the first bracket 400 and the second bracket 500 are coupled by sliding and reach the coupling position, the protrusion 410 is inserted into the insertion groove 510.

In this case, since the second inclined portion 414 is formed to be directed toward the driver and the second catching projection 413 is formed to be directed toward the vehicle, the second catching projection 413 is fixed to the insertion groove 510. Therefore, the first bracket 400 and the second bracket 500 may be smoothly coupled by sliding along an inclined surface of the second inclined portion 414, and the second catching projection 413 is inserted and fixed into the insertion groove 510, such that it is possible to prevent the first bracket 400 and the second bracket 500, which are preliminarily coupled, from being separated.

A first through hole 420 is formed at one end of the first bracket 400 and penetrates the first bracket 400 toward the center of the rim 110. A second through hole 520 is formed at one end of the second bracket 500 and penetrates the second bracket 500 toward the center of the rim 110. In the state in which the first bracket 400 and the second bracket 500 overlap each other, the first bracket 400 and the second bracket 500 are coupled to the body part 120 by a bolt simultaneously penetrating the first through hole 420 and the second through hole 520.

Referring further to FIGS. 3 to 4, the first through hole 420 may be formed at one end of the first bracket 400 and penetrates the first bracket 400 toward the center of the rim 110, and the second through hole 520 may be formed at one end of the second bracket 500 and penetrates the second bracket 500 toward the center of the rim 110. In the preliminarily coupled state in which the first bracket 400 and the second bracket 500 are coupled to each other by sliding, the first through hole 420 and the second through hole 520 may be positioned and the same position. After the first bracket 400 and the second bracket 500 are fastened to the fastening part 122 by being inserted into the coupling groove 121 of the body part 120 in the state in which the first bracket 400 and the second bracket 500 overlap each other, the bolt may penetrate both the first through hole 420 and the second through hole 520 and then be fixed to the fastening part 122, thereby coupling the display device 300 and the airbag module 200 integrally to the steering wheel 100.

Therefore, since the display device 300 and the airbag module 200 may be coupled integrally to the steering wheel 100 by bolting at a time, it is possible to simplify a manufacturing process.

While the specific embodiments of the present disclosure have been illustrated and described, it will be obvious to those skilled in the art that the present disclosure may be variously modified and changed without departing from the technical spirit of the present disclosure defined in the appended claims.

What is claimed is:

1. A steering wheel module for a vehicle, the steering wheel module comprising:
a steering wheel having a rim and a body part extending from a central portion of the rim toward a vehicle and coupled to the vehicle;
an airbag device coupled to the body part and having a cushion configured to be deployed toward a driver when the airbag device operates;
a display device coupled to the body part in a state in which the display device is spaced apart from the airbag device and positioned to be closer to the driver than the airbag device;
a first bracket having one end coupled to the body part and another end extending toward the driver and coupled to the airbag device; and
a second bracket having one end coupled to the body part and the other end coupled to the display device and extending toward the driver further than the other end of the first bracket.

2. The steering wheel module of claim 1, wherein the first bracket and the second bracket extend in a state in which the first bracket and the second bracket overlap each other in a partial area, and
wherein the body part has a coupling groove so that the first bracket and the second bracket, which overlap each other, penetrate the coupling groove or are inserted into the coupling groove.

3. The steering wheel module of claim 2, wherein a plurality of coupling grooves is formed to be spaced apart from one another in a direction from a center of the rim to a plane on which the rim extends.

4. The steering wheel module of claim 2, wherein a fastening part is provided on the body part and extends from one side edge of the coupling groove toward the driver or the vehicle, and
wherein the first bracket and the second bracket penetrating the coupling groove are simultaneously coupled to the fastening part in the state in which the first bracket and the second bracket overlap each other.

5. The steering wheel module of claim 4, wherein the fastening part has a first recessed groove recessed toward a center of the rim, and the first bracket and the second bracket are fastened to the fastening part by being inserted into the first recessed groove in the state in which the first bracket and the second bracket overlap each other.

6. The steering wheel module of claim 2, wherein a first through hole is formed at one end of the first bracket and penetrates the first bracket toward a center of the rim, a second through hole is formed at one end of the second bracket and penetrates the second bracket toward the center of the rim, and the first bracket and the second bracket are coupled to the body part by a bolt simultaneously penetrating the first through hole and the second through hole in the state in which the first bracket and the second bracket overlap each other.

7. The steering wheel module of claim 1, wherein the first bracket has a second recessed groove recessed to correspond to the second bracket, and the second bracket is inserted into the second recessed groove and extends in a state in which the first bracket and the second bracket overlap each other in a partial area.

8. The steering wheel module of claim 1, wherein the second bracket has a second recessed groove recessed to correspond to the first bracket, and the first bracket is inserted into the second recessed groove and extends in a state in which the first bracket and the second bracket overlap each other in a partial area.

9. The steering wheel module of claim 1, wherein the first bracket and the second bracket extend to be slidable relative to each other in a partial area in a state in which the first bracket and the second bracket overlap each other, and wherein the first bracket and the second bracket have a protrusion and an insertion groove, respectively, to prevent a sliding movement at a preset sliding position.

10. The steering wheel module of claim 9, wherein the protrusion comprises:

a first catching projection formed to be stepped from a surface of the first bracket or the second bracket toward the driver; and a first inclined portion inclined in a direction from the first catching projection to the vehicle.

11. The steering wheel module of claim 9, wherein the protrusion comprises:

a second catching projection formed to be stepped from a surface of the first bracket or the second bracket toward the vehicle; and a second inclined portion inclined in a direction from the second catching projection to the driver.

12. The steering wheel module of claim 1, wherein the rim is formed in a ring shape.

* * * * *